United States Patent
Urano et al.

(10) Patent No.: US 12,306,304 B2
(45) Date of Patent: May 20, 2025

(54) TARGET DETECTION APPARATUS AND VEHICLE HAVING THE SAME MOUNTED THEREON

(71) Applicant: TOYOTA JIDOSHA KABUSHIKI KAISHA, Toyota (JP)

(72) Inventors: Hiromitsu Urano, Numazu (JP); Shoichi Hayasaka, Atsugi (JP); Keisuke Hokai, Gotemba (JP); Takuya Migishima, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 906 days.

(21) Appl. No.: 17/485,907

(22) Filed: Sep. 27, 2021

(65) Prior Publication Data
US 2022/0171063 A1   Jun. 2, 2022

(30) Foreign Application Priority Data

Nov. 30, 2020   (JP) .................. 2020-198837

(51) Int. Cl.
*G01S 17/89* (2020.01)
*B60Q 9/00* (2006.01)
(Continued)

(52) U.S. Cl.
CPC .............. *G01S 17/89* (2013.01); *B60Q 9/008* (2013.01); *B60W 50/14* (2013.01); *G01S 17/931* (2020.01); *G06V 20/58* (2022.01); *B60W 2554/20* (2020.02); *B60W 2556/40* (2020.02); *G06V 2201/07* (2022.01)

(58) Field of Classification Search
CPC ....... G01S 17/89; G01S 17/931; B60Q 9/008; B60Q 1/507; B60Q 1/525; B60Q 5/006; B60W 50/14; B60W 2554/20; B60W 2556/40; B60W 60/0015; B60W 40/00; B60W 40/02; B60W 50/00; G06V 20/58;
(Continued)

(56) References Cited

U.S. PATENT DOCUMENTS 5,956,424 A * 9/1999 Wootton .......... G08B 13/19602
340/541
2005/0012604 A1   1/2005 Takahashi
(Continued)

FOREIGN PATENT DOCUMENTS

JP   2005-032063 A   2/2005
JP   2014-016962 A   1/2014
(Continued)

*Primary Examiner* — Isam A Alsomiri
*Assistant Examiner* — Joseph C Fritchman
(74) *Attorney, Agent, or Firm* — Dinsmore & Shohl LLP

(57) ABSTRACT

A target detection apparatus is configured to recognize a stationary object present within a detection range of an external sensor based on map information. Next, the target detection apparatus is configured to determine, by checking an image of the stationary object detected by the external sensor against the stationary object recognized from the map information, whether the image of the stationary object detected by the external sensor includes an undetected region. When the undetected region is identified, the target detection apparatus is configured to recognize an undetectable object present between the stationary object and a vehicle.

6 Claims, 16 Drawing Sheets

(51) Int. Cl.
   *B60W 50/14* (2020.01)
   *G01S 17/931* (2020.01)
   *G06V 20/58* (2022.01)

(58) Field of Classification Search
   CPC .............. G06V 2201/07; G06V 10/803; G06V 10/147; G08B 25/10
   See application file for complete search history.

(56) References Cited

U.S. PATENT DOCUMENTS

| | | | |
|---|---|---|---|
| 2018/0204076 A1* | 7/2018 | Tripathi | G06V 20/58 |
| 2019/0138823 A1* | 5/2019 | Doria | G06V 20/588 |
| 2020/0301019 A1 | 9/2020 | Shiba et al. | |
| 2021/0197831 A1* | 7/2021 | Choi | B60W 40/09 |

FOREIGN PATENT DOCUMENTS

| | | |
|---|---|---|
| JP | 2019-095290 A | 6/2019 |
| JP | 2020-154983 A | 9/2020 |

\* cited by examiner

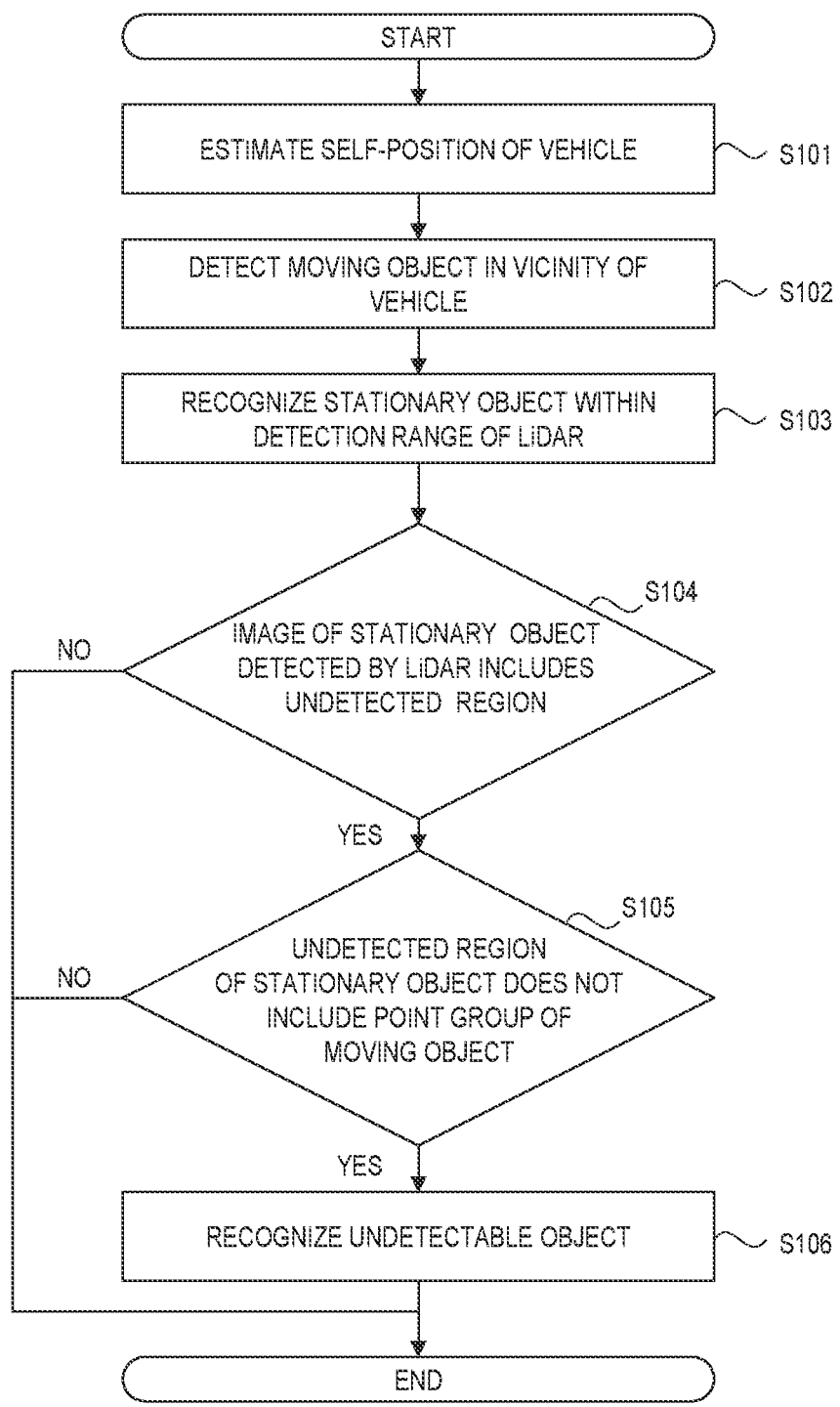

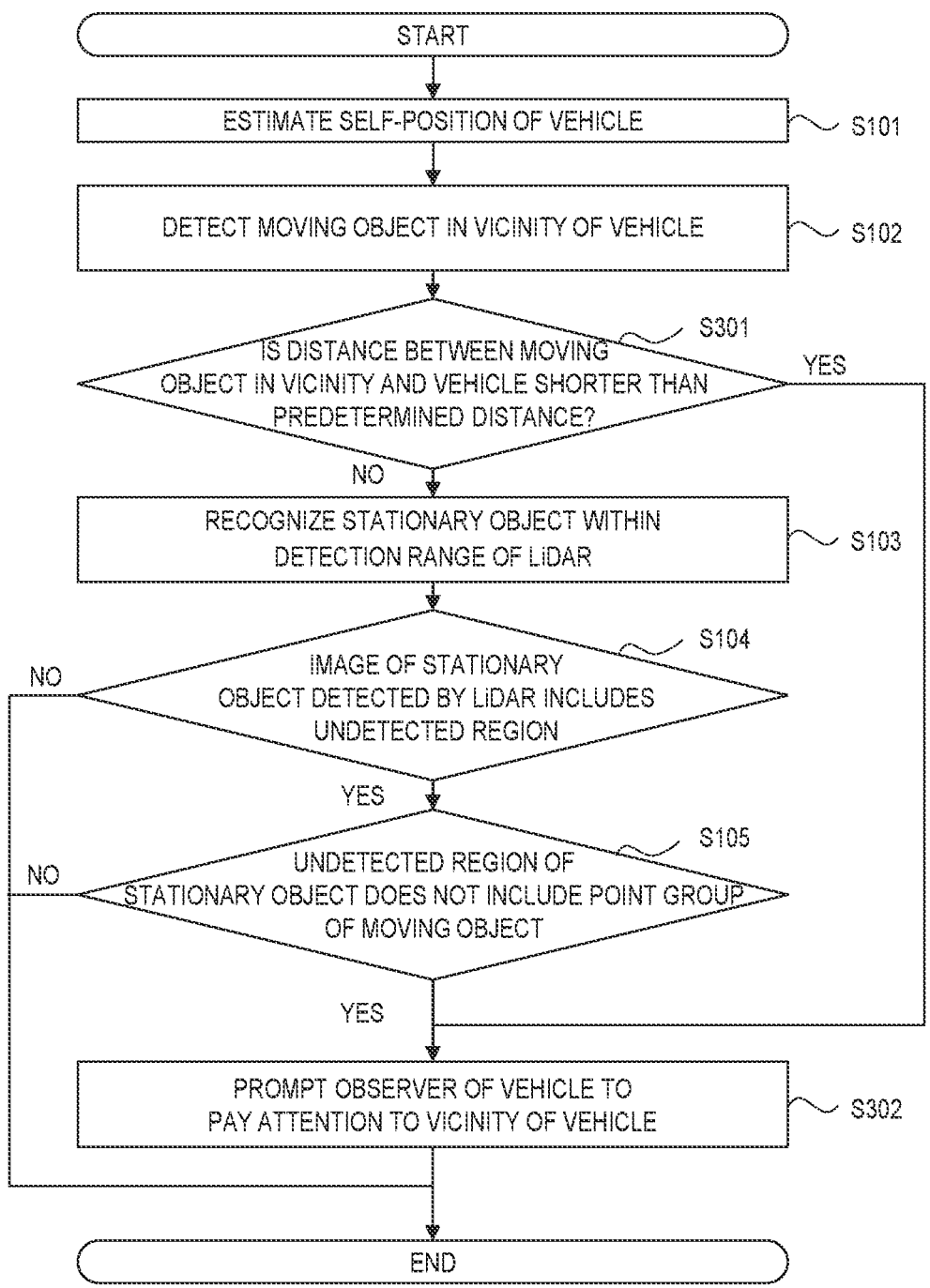

TARGET DETECTION APPARATUS AND VEHICLE HAVING THE SAME MOUNTED THEREON

CROSS-REFERENCE TO RELATED APPLICATION

This application claims priority to Japanese Patent Application No. 2020-198837 filed on Nov. 30, 2020, incorporated herein by reference in its entirety.

BACKGROUND

1. Technical Field

The present disclosure relates to a target detection apparatus mounted on a vehicle, and to a vehicle having the same mounted thereon.

2. Description of Related Art

Various methods of accurately distinguishing a target in the vicinity of a vehicle have been proposed. For example, Japanese Unexamined Patent Application Publication No. 2019-095290 (JP 2019-095290 A) discloses a technology for accurately distinguishing a wall from an effective target. In the prior art described in JP 2019-095290 A, when a point group (a first point group) longer than a base length is measured by a light detection and ranging (LiDAR), the point group is classified as a wall. In addition, a second point group other than the first point group classified as a wall is classified as a target candidate. Then, when there is a plurality of first point groups representing a single wall and a predetermined condition is satisfied between end points of the first point group and end points of the second point group, the second point group is confirmed as an effective target.

SUMMARY

However, an external sensor including the LiDAR has a condition that makes it difficult to detect an object due to characteristics of the external sensor. When the object cannot be detected by the external sensor, the target candidate cannot be obtained, either.

The present disclosure provides a target detection apparatus capable of recognizing an object present in the vicinity of a vehicle even under a condition where it is difficult to detect the object by an external sensor. In addition, together with the above device, the present disclosure also provides a vehicle on which the target detection apparatus is mounted.

A target detection apparatus according to a first aspect of the present disclosure is mounted on a vehicle, and includes an external sensor configured to acquire information on an external situation of the vehicle, a storage device configured to store map information, and an information processing device. The information processing device is configured to process the information acquired by the external sensor and the map information. The processes executed by the information processing device include a first process, a second process, and a third process. In the first process, the information processing device recognizes a stationary object present within a detection range of the external sensor based on the map information. In the second process, by checking an image of the stationary object detected by the external sensor against the stationary object recognized from the map information, the information processing device determines whether the image of the stationary object detected by the external sensor includes an undetected region. In the third process, when the undetected region is identified, the information processing device recognizes an undetectable object present between the stationary object and the vehicle.

With the target detection apparatus having the above configuration, when the undetectable object that cannot be directly detected by the external sensor is present in the vicinity of the vehicle, it is possible to indirectly recognize the undetectable object by using a detection result of the stationary object by the external sensor.

The external sensor may be a LiDAR. In this case, the information processing device determines whether the image of the stationary object detected by the LiDAR includes a region in which the point group is not acquired, that is, a point group unacquired region. When the external sensor is the LiDAR, the point group unacquired region is the above-described undetected region. When the image of the stationary object includes the point group unacquired region and the point group unacquired region corresponds to a point group having a predetermined number of points or more, the information processing device may recognize the undetectable object present between the stationary object and the vehicle.

The external sensor may be a camera. In this case, the information processing device determines whether the image of the stationary object detected by the camera includes a region in which the image is unrecognizable, that is an image unrecognizable region. When the external sensor is the camera, the image unrecognizable region is the above-described undetected region. When the image of the stationary object includes the image unrecognizable region, and the image unrecognizable region corresponds to a pixel group having a predetermined number of pixels or more, the information processing device may recognize the undetectable object present between the stationary object and the vehicle.

Further, when a moving object which had been detected by the external sensor is not detected by the external sensor even though it is not confirmed that the moving object moves out of a detection range of the external sensor, the information processing device may recognize the undetectable object present in an undetectable range of the external sensor. With the apparatus, when a stationary object that can be used for recognizing the undetectable object is not present in the vicinity, it is possible to recognize the moving object that has moved to the undetectable range, that is, the undetectable object, from the motion of the moving object within the detection range of the external sensor.

A first vehicle according to a second aspect of the present disclosure is an autonomously traveling vehicle having the target detection apparatus mounted thereon. The first vehicle includes a vehicle control device configured to control the vehicle based on a target including an undetectable object detected by the target detection apparatus. With the first vehicle, since not only the object detected by the external sensor but also the undetectable object recognized by the target detection apparatus is treated as a target for autonomous traveling, safer autonomous traveling is possible.

A second vehicle according to a third aspect of the present disclosure is an autonomously traveling vehicle having the target detection apparatus mounted thereon. The second vehicle includes an alarm device configured to set off an alarm to an outside of the vehicle at a time of starting the vehicle when an undetectable object is recognized by the target detection apparatus. With the second vehicle, a safer starting of the vehicle is possible by setting off the alarm for the undetectable object that cannot be detected by an external sensor.

A third vehicle according to a fourth aspect of the present disclosure is a vehicle having the target detection apparatus mounted thereon. The third vehicle includes a notification device that notifies, when the undetectable object is recognized by the target detection apparatus, an observer of the vehicle of a presence of the undetectable object. The observer referred to here includes a remote assistance operator who remotely assists an autonomously driven vehicle from a remote location via a communication network, a remote driver who remotely drives a remotely driven vehicle from a remote location via a communication network, and a driver who is aboard a vehicle and directly drives it. With the third vehicle, since the observer is notified of the presence of the undetectable object that cannot be detected by the external sensor, the observer can monitor the vehicle while paying attention to the vicinity of the vehicle.

As described above, with the target detection apparatus according to the present disclosure, when an undetectable object that cannot be directly detected by an external sensor is present in the vicinity of a vehicle, it is possible to indirectly recognize an undetectable object by using a detection result of a stationary object by the external sensor.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 8 is a flowchart illustrating procedures for recognizing the undetectable object by the target detection apparatus according to the first embodiment;

FIG. 11 is a flowchart illustrating procedures for determining a notification when the target detection apparatus according to the first embodiment is applied to an alert notification to an observer;

DETAILED DESCRIPTION OF EMBODIMENTS

In each of the embodiments described below, like signs denote like elements in each drawing, and duplicate description will be omitted or simplified. In addition, when the number, quantity, amount, range, and the like, of each element are referred to in the embodiment below, the present disclosure is not limited to the number referred to, unless otherwise specified or clearly specified by the number in principle.

First Embodiment

Overview

First, an overview of a first embodiment will be described with reference to FIGS. 1 to 6B.

Figure 1:
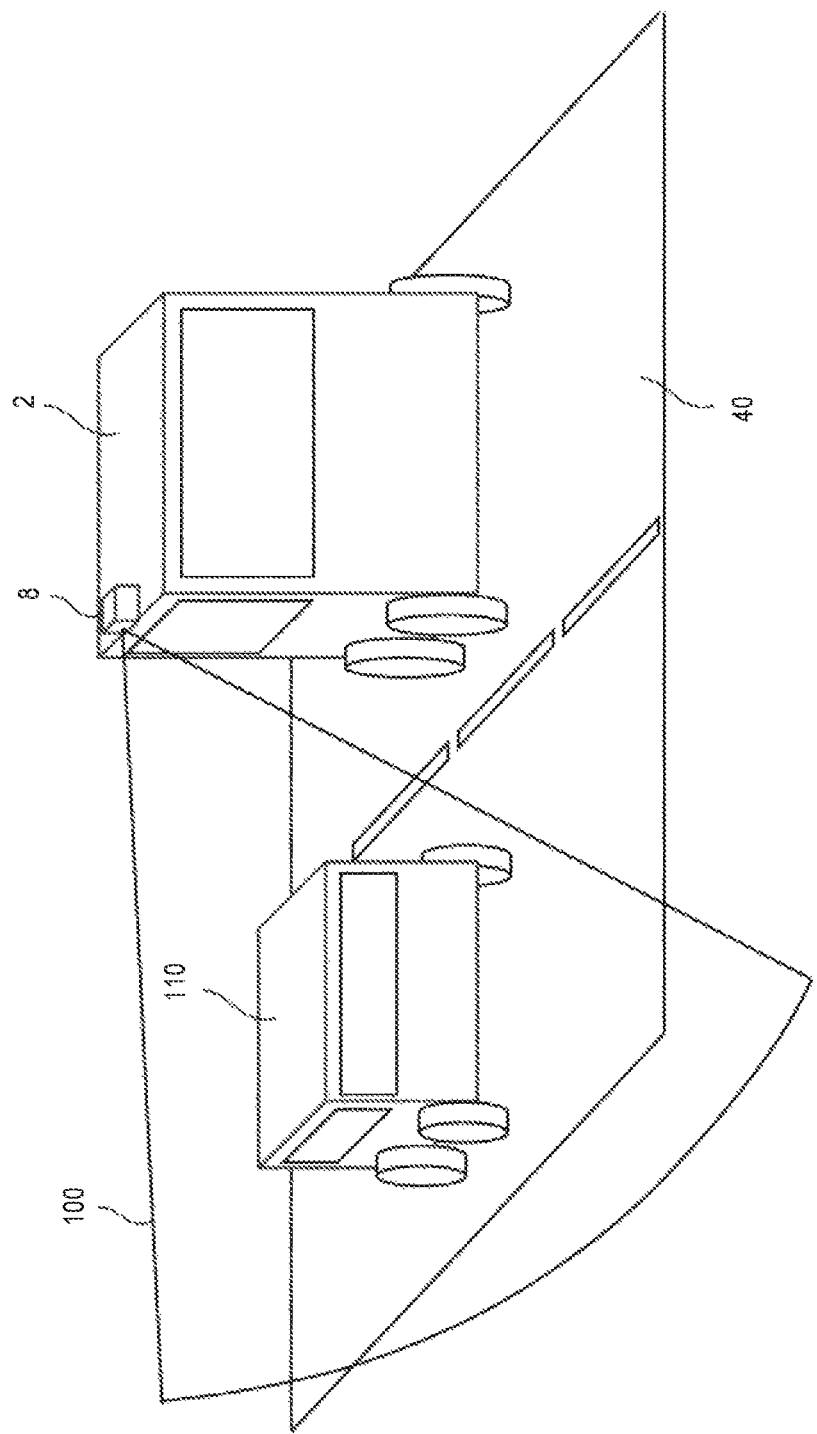
FIG. 1 is a diagram illustrating an example of a vehicle to which a target detection apparatus is applied.

FIG. 1 illustrates two vehicles 2, 110 traveling in parallel on a road 40. At least the vehicle 2 of the two vehicles 2, 110 is an autonomously driven vehicle to which a target detection apparatus according to the present disclosure is applied. The vehicle 2 includes an external sensor 8 that acquires information on an external situation of the vehicle 2. Examples of the external sensor 8 include a LiDAR, a camera, a fusion of a LiDAR and a camera, and a fusion of the above and a millimeter-wave radar. In an example illustrated in FIG. 1, the external sensor 8 is mounted on the roof of the vehicle 2 and senses the side of the vehicle 2 from the roof of the vehicle 2. In FIG. 1, a fan-shaped range 100 extending from the roof of the vehicle 2 schematically represents a detection range of the external sensor 8. When the vehicle 110 is present in the detection range 100 of the external sensor 8, the vehicle 110 is detected as a target. For example, when the vehicle 2 changes lanes, a relative position and relative speed of the vehicle 110 traveling in the adjacent lane are reflected in a calculation of a target trace of the vehicle 2.

However, there is a case where even an object present in the detection range 100 of the external sensor 8 may not be detected by the external sensor 8 depending on detection conditions. A situation where an object cannot be detected differs depending on the type of the external sensor 8. In the description of the overview of the first embodiment with reference to FIGS. 2 to 6B, it is assumed that the external sensor 8 means a LiDAR. In the description of the overview below, the external sensor is written as a LiDAR.

Figure 2:
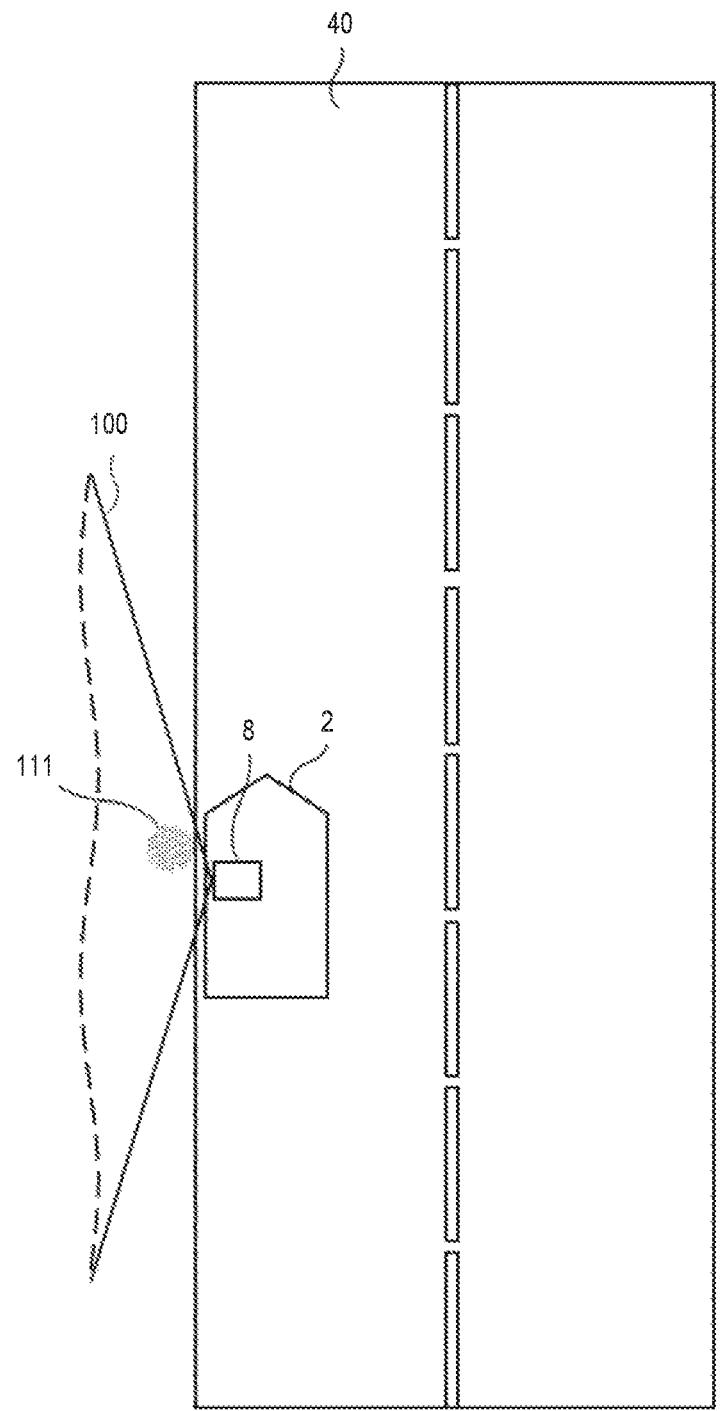
FIG. 2 is a diagram used for describing a first case in which detection of a target by a LiDAR is impossible.

FIG. 2 is a diagram used for describing a first case in which detection of a target by the LiDAR is impossible. When an object is present in the detection range 100 of the LiDAR, the laser beam emitted from the LiDAR is reflected on the surface of the object. The LiDAR receives the reflected light and acquires point group data of the object. However, as illustrated in FIG. 2, when a distance between an object 111 and the LiDAR is extremely short, for example, within several tens of centimeters, it is difficult to distinguish the point group obtained from the object 111 from sensor noise of the LiDAR. The point group from the object 111 also ends up removed by a filtering process of the sensor noise. In other words, in the case of the object 111 which is extremely close to the vehicle 2, there is a possibility that the object 111 cannot be directly detected by the LiDAR even though it is present within the detection range 100 of the LiDAR.

Figure 3:
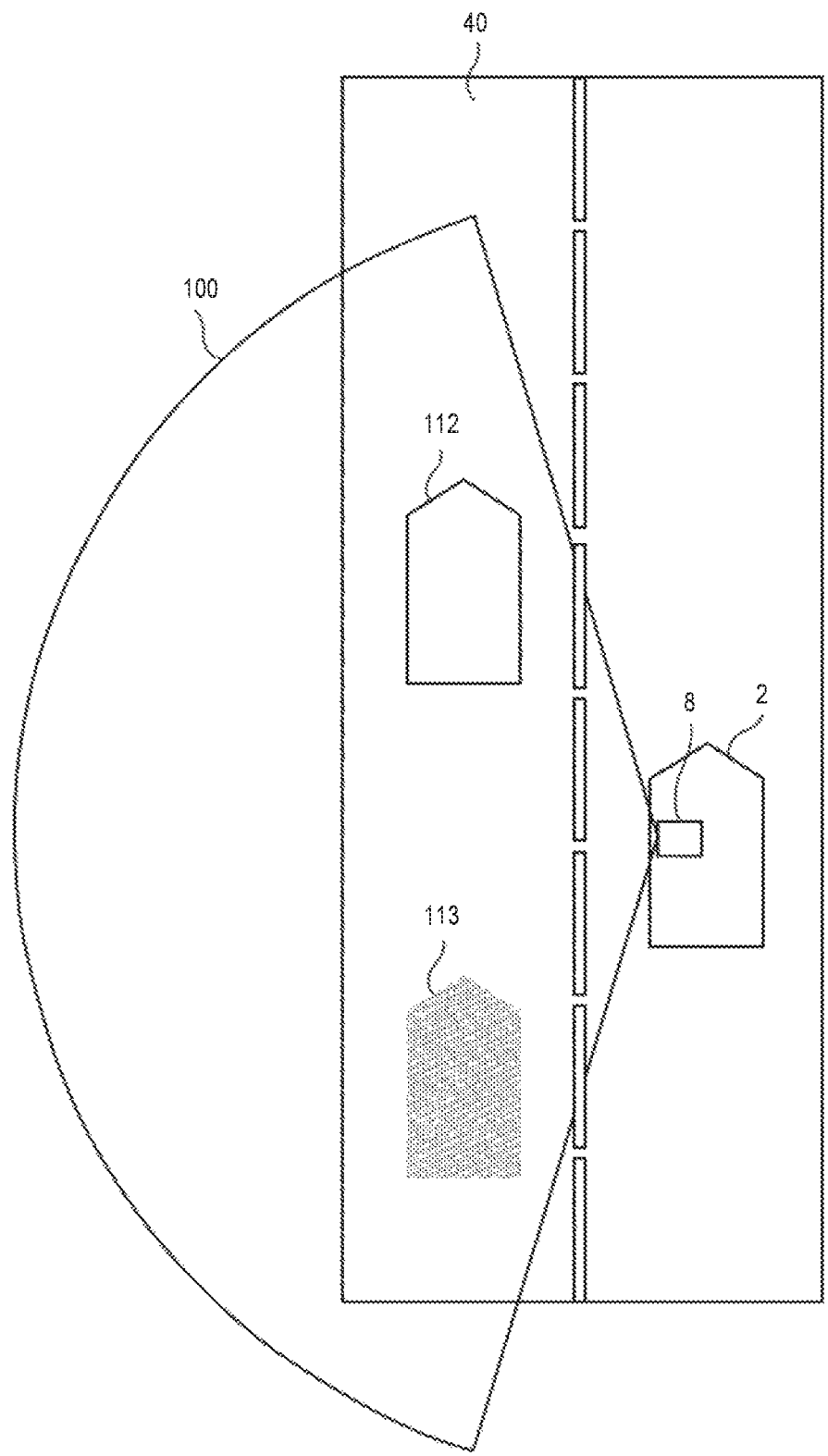
FIG. 3 is a diagram used for describing a second case in which detection of a target by the LiDAR is impossible.

FIG. 3 is a diagram used for describing a second case in which detection of a target by the LiDAR is impossible. As described above, the LiDAR receives the reflected light of the laser beam which was emitted in order to acquire a point group of the object. For this reason, it is difficult to acquire a point group from an object having a low reflectance of the laser beam, such as a black object that absorbs light. For example, it is assumed that a white vehicle 112 and a black vehicle 113 are traveling in the lane next to the vehicle 2. Even when both vehicles 112, 113 are within the detection range 100 of the LiDAR, it is possible to acquire a point group from the white vehicle 112 but difficult to acquire a point group from the black vehicle 113. In other words, in the case of the object 113 that absorbs the laser beam, there is a possibility that the vehicle 113 cannot be directly detected by the LiDAR even though it is present within the detection range 100 of the LiDAR.

Figure 4A:
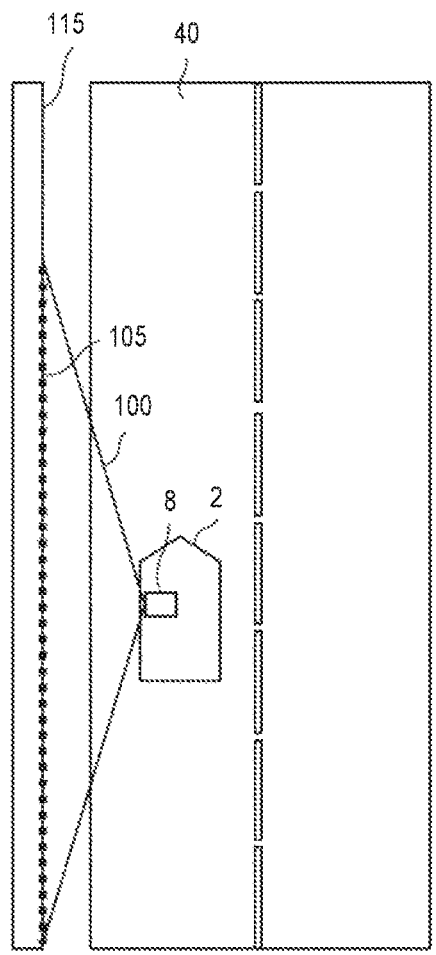
FIG. 4A is a diagram used for describing a method of recognizing the undetectable object that is not detected by the LiDAR by using a stationary object present in the vicinity of the vehicle.
Figure 4B:
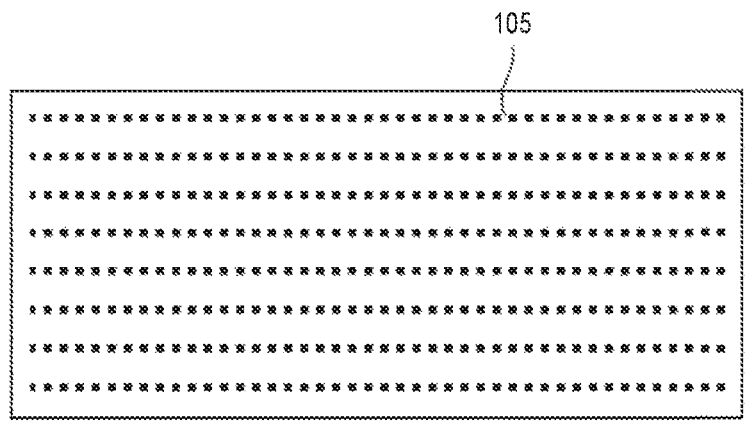
FIG. 4B is a diagram used for describing a method of recognizing the undetectable object that is not detected by the LiDAR by using a stationary object present in the vicinity of the vehicle.
Figure 5A:
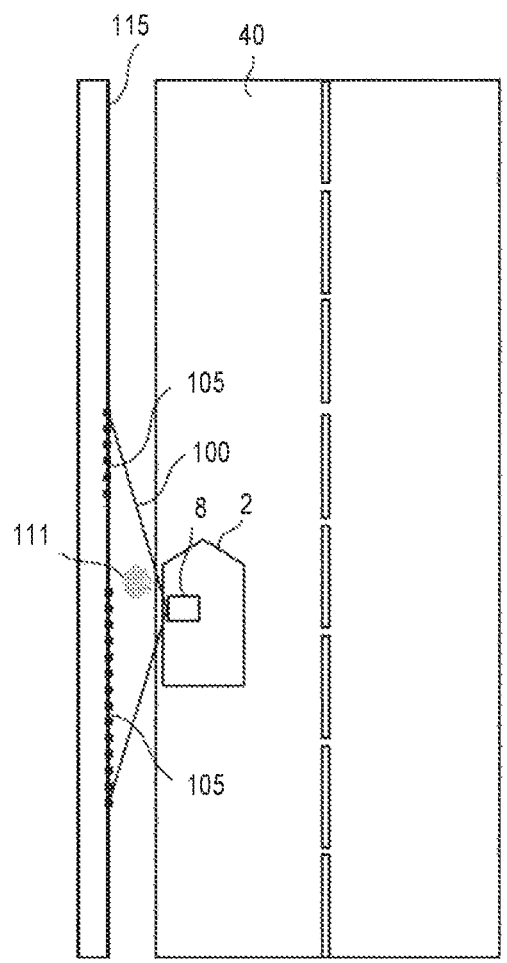
FIG. 5A is a diagram used for describing another method of recognizing the undetectable object that is not detected by the LiDAR by using the stationary object present in the vicinity of the vehicle, and is a diagram illustrating an advantageous effect in the first case.
Figure 5B:
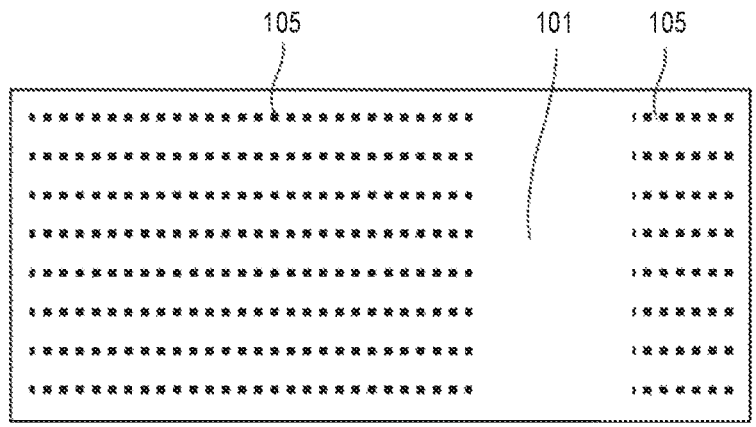
FIG. 5B is a diagram used for describing another method of recognizing the undetectable object that is not detected by the LiDAR by using the stationary object present in the vicinity of the vehicle, and is a diagram illustrating an advantageous effect in the first case.
Figure 6A:
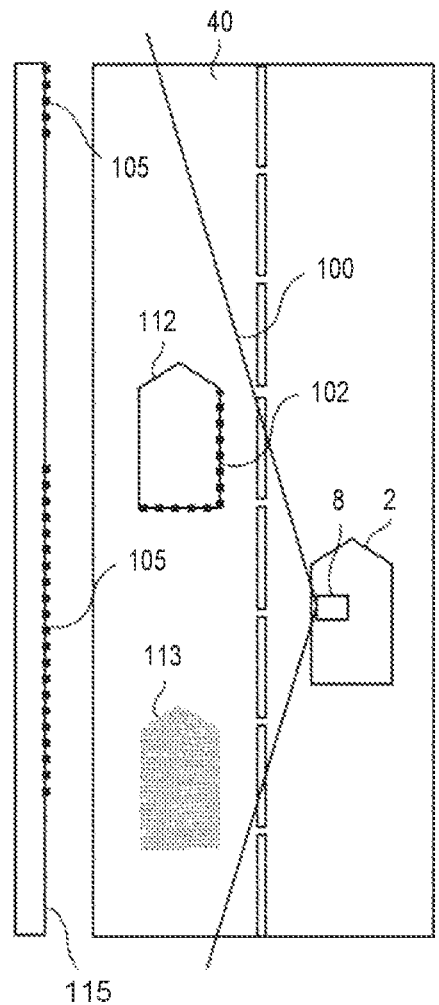
FIG. 6A is a diagram used for describing yet another method of recognizing the undetectable object that is not detected by the LiDAR by using the stationary object present in the vicinity of the vehicle, and is a diagram illustrating an advantageous effect in the second case.
Figure 6B:
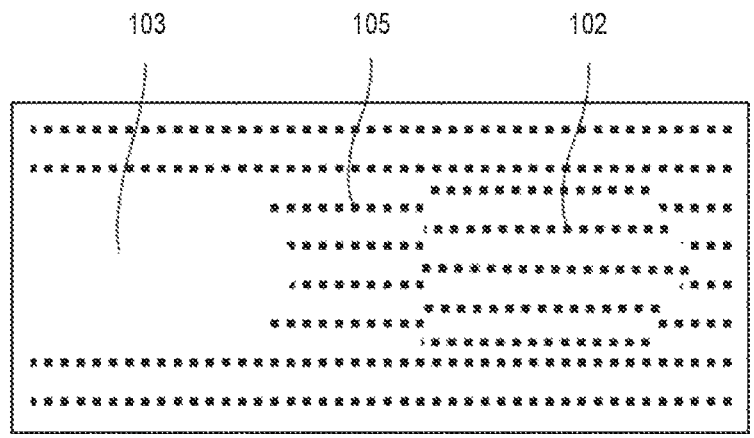
FIG. 6B is a diagram used for describing yet another method of recognizing the undetectable object that is not detected by the LiDAR by using the stationary object present in the vicinity of the vehicle, and is a diagram illustrating an advantageous effect in the second case.

As in the first and second cases described above, depending on detection conditions, there is a case where an undetectable object that cannot be directly detected by the LiDAR is present in the vicinity of the vehicle 2. Therefore, as described below with reference to FIGS. 4A to 6B, in the first embodiment, an undetectable object that is not detected by the LiDAR is recognized by using a stationary object present in the vicinity of the vehicle 2. Each of FIGS. 4A, 5A, and 6A is a plan view illustrating the positional relationship between the vehicle 2 and an object. Each of FIGS. 4B, 5B and 6B is an output image of the LiDAR corresponding to FIGS. 4A, 5A, and 6A, respectively. The output image of the LiDAR means an image obtained by converting point group data into two-dimensional image data.

As illustrated in FIG. 4A, there is a case where the stationary object 115, such as a wall, a guardrail, or a fence, may be installed and present along the shoulder of the road 40. When the stationary object 115 is within the detection range 100 of the LiDAR, the LiDAR obtains a point group 105 from the stationary object 115. Generally, during traveling of the vehicle 2, the stationary object 115, such as a wall, a guardrail, or a fence, is not present in the immediate vicinity of the vehicle 2. In addition, generally, the color of this type of stationary object 115 is not black enough to absorb the laser beam. Therefore, as long as the stationary object 115 is within the detection range 100 of the LiDAR, the point group 105 that captures the stationary object 115 is output from the LiDAR, as illustrated in FIG. 4B.

FIGS. 5A and 5B are diagrams illustrating an example in which a method of recognizing an undetectable object that is not detected by the LiDAR by using the stationary object 115 is applied to the first case. In the example illustrated in FIG. 5A, the stationary object 115 is present along the shoulder of the road 40, and the undetectable object 111 is present in the immediate vicinity of the vehicle 2 on an inward side of the stationary object 115. In this state, since the laser beam is blocked by the undetectable object 111, it is not possible to obtain a point group from a part of the stationary object 115 on which the shadow of the undetectable object 111 is cast.

When the LiDAR, the stationary object 115, and the undetectable object 111 are in the positional relationship illustrated in FIG. 5A, an output image of the LiDAR can be obtained, as illustrated in FIG. 5B. In other words, in the point group 105 that captures the stationary object 115, a point group unacquired region 101 in which the point group has not been acquired appears. The point group unacquired region 101 is an undetected region in which the stationary object 115 is not detected. It can be determined from the map information whether the point group unacquired region 101 is an undetected region in which the point group 105 is not obtained even though the stationary object 115 is present, or a region in which the stationary object 115 is not present in the first place. In other words, by checking against the stationary object recognized from the map information, it is possible to determine whether the image of the stationary object 115 detected by the LiDAR includes the undetected region. When the undetected region is identified in the point group 105 of the stationary object 115, it is possible to indirectly recognize the undetectable object 111 present between the stationary object 115 and the vehicle 2.

FIGS. 6A and 6B are diagrams illustrating an example in which a method of recognizing an undetectable object that is not detected by the LiDAR by using the stationary object 115 is applied to the second case. In the example illustrated in FIG. 6A, the stationary object 115 is present along the shoulder of the road 40, and two vehicles 112, 113 are present between the vehicle 2 and the stationary object 115. As described above, the vehicle 113, one of the two vehicles, is a black vehicle from which it is difficult to acquire a point group because it absorbs the laser beam, thus it is an undetectable object. Since the laser beam is blocked by the two vehicles 112, 113, it is not possible to obtain point groups from parts of the stationary object 115 on which the shadows of the vehicles are cast.

When the LiDAR, the stationary object 115, and the two vehicles 112, 113 are in the positional relationship as illustrated in FIG. 6A, an output image of the LiDAR can be obtained as illustrated in FIG. 6B. In other words, in the point group 105 that captures the stationary object 115, a point group 102 that captures the vehicle 112 and a point group unacquired region 103 in which the point group has not been acquired appear. The point group unacquired region 103 is an undetected region in which the stationary object 115 is not detected because the shadow of the black vehicle 113 is cast on the region. In this case as well, by checking against the stationary object recognized from the map information, it can be determined whether the point group unacquired region 103 is an undetected region in which the point group 105 is not obtained even though the stationary object 115 is present. When the undetected region is identified in the point group 105 of the stationary object 115, it is possible to indirectly recognize the undetectable object 113 present between the stationary object 115 and the vehicle 2.

Configuration of Autonomously Driven Vehicle

Figure 7:
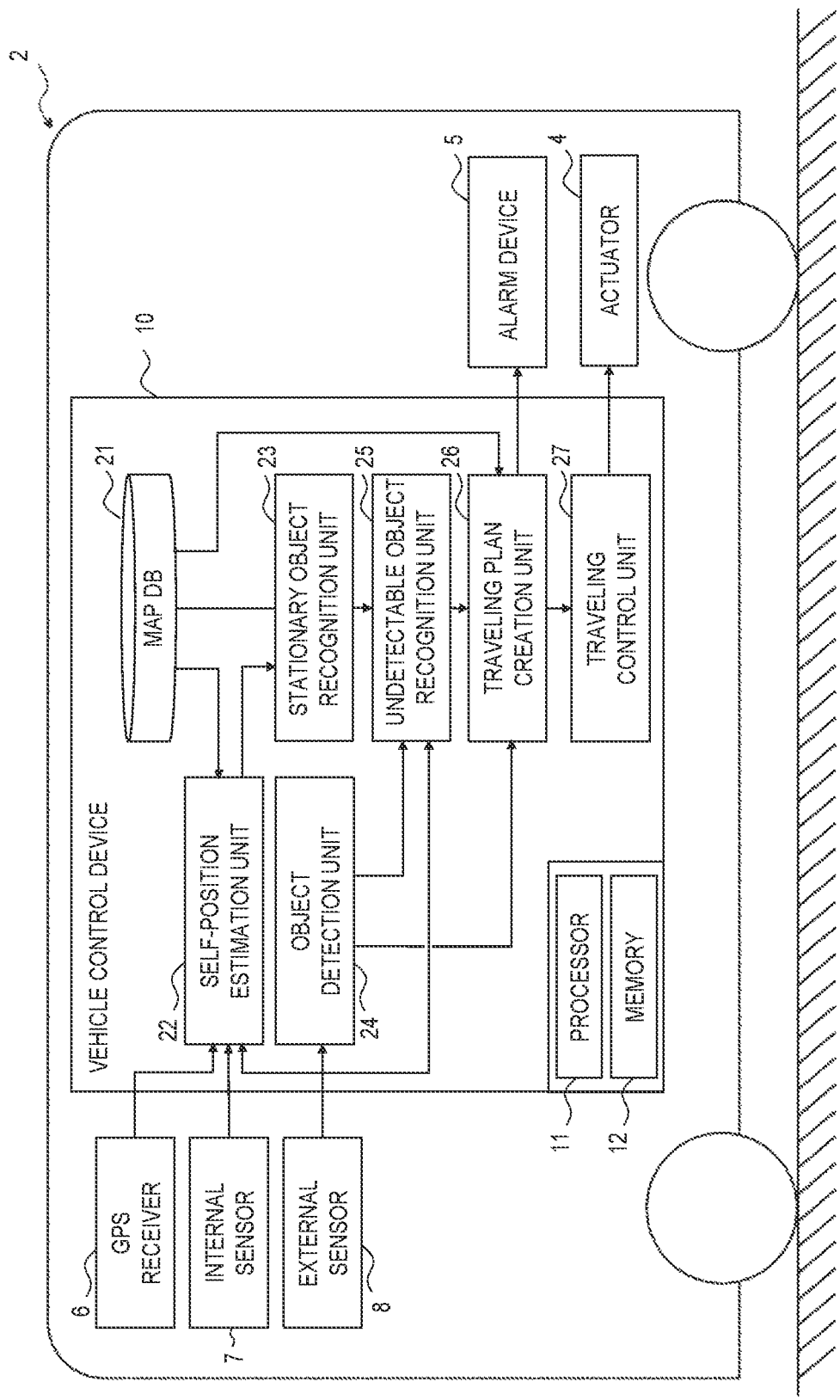
FIG. 7 is a block diagram illustrating a configuration of an autonomously driven vehicle to which the target detection apparatus according to a first embodiment is applied.

FIG. 7 is a block diagram illustrating a configuration of the vehicle 2 as an autonomously driven vehicle to which the target detection apparatus according to the first embodiment is applied. The vehicle 2 includes a vehicle control device 10 that controls the vehicle 2, an in-vehicle sensor that inputs information to the vehicle control device 10, an actuator 4 that operates via a signal output from the vehicle control device 10, and an alarm device 5 that sets off an alarm to the outside of the vehicle 2.

The in-vehicle sensor includes a GPS receiver 6, an internal sensor 7, and the external sensor 8. The GPS receiver 6 measures the current position (for example, latitude and longitude) of the vehicle 2 by receiving a signal from a GPS satellite. The internal sensor 7 detects a traveling state of the vehicle 2. The internal sensor 7 includes an inertial measurement unit (IMU) that detects the angles and accelerations of three axes involved in the motion of the vehicle 2, and a vehicle speed measurement device that calculates a vehicle speed from a rotation speed of wheels. Examples of the external sensor 8 may include a LiDAR, a camera, a fusion of a LiDAR and a camera, and a fusion of the above and a millimeter-wave radar. A target is detected based on information obtained by the external sensor 8.

The actuator 4 includes, specifically, a steering actuator that steers the vehicle 2, a drive actuator that drives the vehicle 2, and a braking actuator that brakes the vehicle 2. The alarm device 5 is, specifically, a speaker that generates voice, a display device that displays information, or a combination thereof. The alarm device 5 prompts pedestrians in the vicinity of the vehicle 2 to move away from the vehicle 2 via voice, display, or a combination thereof.

The vehicle control device 10 is an electronic control unit (ECU) having at least one processor 11 and at least one memory 12. The memory 12 includes a primary storage device and a secondary storage device. The memory 12 stores a program that can be executed by the processor 11 and various types of data associated therewith. When the processor 11 executes the program stored in the memory 12, various functions are implemented in the vehicle control device 10. The program includes a program that causes the vehicle control device 10 to function as an information processing device of the target detection apparatus and recognize an undetectable object. The ECU composing the vehicle control device 10 may be a set of a plurality of ECUs.

The data stored in the memory 12 includes the map information. The map information is managed by a map database (map DB) 21. Examples of the map information managed by the map DB 21 include information on a road position, information on a road shape (such as a curve, a straight-line type, and a curvature of a curve), information on a branch point of an intersection, information on a target route on which the subject vehicle travels, and information on a road structure. Examples of the information on the road structure include information on stationary objects, such as walls, white lines, poles, signboards, signs, guardrails, and fences, which can be acquired by the external sensor 8. The map DB 21 is stored in advance in the secondary storage device, such as an SSD or an HDD. However, the map information may be downloaded from an external server via the Internet, or the map information on the external server may be referred to.

The vehicle control device 10 has a configuration associated with a vehicle control at the time of stopping the vehicle, and includes a self-position estimation unit 22, a stationary object recognition unit 23, an object detection unit 24, an undetectable object recognition unit 25, a traveling plan generation unit 26, and a traveling control unit 27. These are implemented as functions of the vehicle control device 10 when the program stored in the memory 12 is executed by the processor 11.

The self-position estimation unit 22 estimates the position of the vehicle 2 on the map based on the position information of the vehicle 2 received by the GPS receiver 6, the information on the traveling state of the vehicle 2 detected by the internal sensor 7, and the map information obtained from the map DB 21. Examples of the information on the traveling state includes vehicle speed information, acceleration information, and yaw rate information. Further, the self-position estimation unit 22 can estimate a relative position between a feature detected by the external sensor 8 and the vehicle 2, the information on the traveling state of the vehicle 2 detected by the internal sensor 7, and the position of the vehicle 2 from the position of the detected feature on the map.

The stationary object recognition unit 23 inquires, of the map DB 21, the position of the vehicle 2 estimated by the self-position estimation unit 22, and recognizes the stationary object present within the detection range of the external sensor 8. Specifically, the detection range of the external sensor 8 is registered in advance for each of a plurality of external sensors 8 provided in the vehicle 2. The stationary object recognition unit 23 determines the presence or absence of a stationary object within the detection range of the external sensor 8 from the map information, and, when a stationary object is present within the detection range, acquires a position of the stationary object on the map.

The object detection unit 24 detects a moving object in the vicinity of the vehicle 2 based on the information received from the external sensor 8 by using a method, such as pattern matching or deep learning, and specifies the position thereof. The information received from the external sensor 8 is point group data when the external sensor 8 is the LiDAR, and image data when the external sensor 8 is the camera. Examples of the moving object detected by the object detection unit 24 include a vehicle, a motorcycle, a bicycle, a pedestrian, and an animal. However, even when the moving object is present in the detection range of the external sensor 8, there is a case where the moving object may not be detected depending on the detection conditions, as described in the Overview. A moving object that cannot be detected by the external sensor 8 is recognized by the undetectable object recognition unit 25, as described below.

The undetectable object recognition unit 25 recognizes the undetectable object present within the detection range of the external sensor 8 by using the information received from the external sensor 8, the position information of the stationary object recognized from the map information, and the position information of the moving object detected by the object detection unit 24. Specifically, as described with reference to FIGS. 5A, 5B, 6A, and 6B, the undetectable object recognition unit 25 checks the image of the stationary object detected by the external sensor 8 against the stationary object recognized from the map information. When the external sensor 8 is the LiDAR, the image of the stationary object means the image obtained by converting the point group data into the two-dimensional image data.

By this checking, the undetectable object recognition unit 25 determines whether the image of the stationary object detected by the external sensor 8 includes the undetected region. Then, when the undetected region is identified, the undetectable object recognition unit 25 recognizes the undetectable object present between the stationary object and the vehicle 2. The undetectable object recognized by the undetectable object recognition unit 25 is detected as a target, together with the moving object detected by the object detection unit 24.

The traveling plan generation unit 26 acquires the target route recorded in the map DB 21, the position of the vehicle 2 recognized by the self-position estimation unit 22, the position of the moving object detected by the object detection unit 24, and the position of the undetectable object recognized by the undetectable object recognition unit 25. The traveling plan generation unit 26 generates a traveling plan according to the target route set in advance, at least based on the target information including the position of the moving object and the position of the undetectable object, and the map information of the map DB 21. The traveling plan generation unit 26 generates the traveling plan, which, in some embodiments, is a set of two elements, that is, configuration coordinates (p, v), which are target positions p in a coordinate system fixed to the vehicle 2 and a speed v at each target point, assuming that there is more than one set of configuration coordinates. When a target that interferes with the traveling plan of the vehicle 2 is detected, the traveling plan generation unit 26 updates the traveling plan so as to avoid a collision with the target by steering or deceleration.

The traveling control unit 27 automatically controls the traveling of the vehicle 2 based on the traveling plan generated by the traveling plan generation unit 26. The traveling control unit 27 outputs a control signal to the actuator 4 according to the traveling plan. As such, the traveling control unit 27 controls the traveling of the vehicle 2 such that the vehicle 2 automatically travels according to the traveling plan.

Procedures for Recognizing Undetected Object

Next, procedures for recognizing the undetectable object according to the first embodiment will be described with reference to FIG. 8. FIG. 8 is a flowchart describing procedures for recognizing the undetectable object, using the vehicle control device 10 as the target detection apparatus according to the first embodiment. In the description of the procedures for recognizing the undetectable object with reference to FIG. 8, it is assumed that the external sensor 8 means the LiDAR. In the description of the procedures for recognition below, the external sensor is written as the LiDAR 8.

According to the flowchart illustrated in FIG. 8, the vehicle control device 10 estimates a self-position of the vehicle 2 on the map based on the information acquired by the GPS receiver 6, the internal sensor 7, and the external sensor 8, respectively, and the map information obtained from the map DB 21 (step S101). Next, the vehicle control device 10 detects the moving object present in the vicinity of the vehicle 2 based on the information acquired by the external sensor 8 (step S102). Further, the vehicle control device 10 recognizes the stationary object present within the detection range of the LiDAR 8 based on the map information from the map DB 21, using the self-position estimated in step S101 as a base point (step S103).

Next, the vehicle control device 10 determines whether the image of the stationary object detected by the LiDAR 8 includes the undetected region (step S104). More specifically, the vehicle control device 10 determines whether the image of the stationary object detected by the LiDAR 8 includes the point group unacquired region in which the point group is not acquired. Then, when the point group unacquired region corresponds to a point group having a predetermined number of points or more, the vehicle control device 10 determines the point group unacquired region as the undetected region in which the stationary object is not detected. The size of the point group unacquired region is proportional to the size of the undetectable object and is inversely proportional to the distance between the vehicle 2 and the undetectable object. The predetermined number of points is set to be small as long as it can be distinguished from noise such that an object in the immediate vicinity can be recognized without omission.

The point group unacquired region in which the point group is not acquired may also be generated by an omission of a packet from communication inside the vehicle. Whether the point group unacquired region is generated by the packet omission can be verified by using an interval of a packet reception. For example, it is normally assumed that data is sent from the LiDAR 8 at an interval of 10 milliseconds, but it takes 30 milliseconds to receive the data on certain occasions. In this case, the presence or absence of the packet omission may be verified 20 milliseconds before the data reception time.

When the image of the stationary object detected by the LiDAR 8 includes the undetected region, the undetectable object is not present within the detection range of the LiDAR 8. Therefore, when the result of the determination in step S104 is negative, the procedures for recognition using the flowchart end.

On the other hand, when the result of the determination in step S104 is positive, the vehicle control device 10 determines whether the undetected region in which the stationary object is not detected includes the point group of the moving object (step S105). More specifically, as illustrated in FIG. 6B, the vehicle control device 10 determines whether the entire undetected region in which the point group 105 is not obtained from the stationary object 115 is a region in which the point group 102 is obtained from the moving object 112 or a region in which no valid point group is obtained as in the point group unacquired region 103.

When the undetected region includes the point group of the moving object, the undetectable object is not present in the undetected region. Therefore, when the result of the determination in step S105 is negative, the procedures for recognition using the flowchart end.

When the undetected region does not include the point group of the moving object, the vehicle control device 10 recognizes an undetectable object present between the stationary object and the vehicle (step S106). According to the above procedures, when the stationary object is present within the detection range of the LiDAR 8, it is possible to indirectly recognize even the undetectable object that cannot be directly detected by the LiDAR 8 by using the detection result.

Since the undetected region is, so to speak, the shadow of the undetectable object, the shape of the undetected region represents the shape of the undetectable object. Therefore, by applying an object recognition method, such as pattern matching or deep learning, to the shape of the undetected region, it is possible to recognize the type of the undetectable object from the shape of the undetected region. By reflecting the type as well as the position of the undetectable object in the traveling plan, it is possible to implement more appropriate autonomous driving with respect to the external situation of the vehicle 2.

Application of Autonomously Driven Vehicle to Starting Control

Figure 9A:
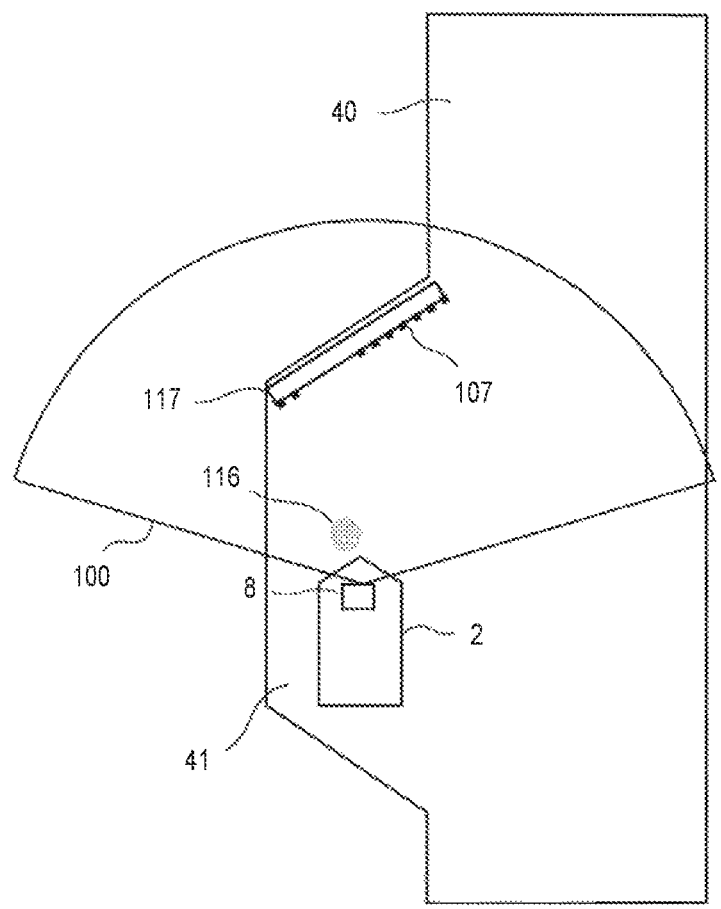
FIG. 9A is a diagram used for describing a method of recognizing the undetectable object that hinders starting of the autonomously driven vehicle.

The undetectable object that cannot be detected by the external sensor 8 is an object that should be noted in order to ensure safety when the vehicle 2 is started. For example, as illustrated in FIG. 9A, when the vehicle 2 is a bus and is stopped at a bus stop 41, a passenger 116 may exit from the vehicle 2 and walk very close to the vehicle 2. As described above, when the distance between the passenger 116 and the vehicle 2 is too close, the passenger 116 may become an undetectable object for the external sensor 8 even when the passenger 116 is within the detection range 100 of the external sensor 8.

Although the passenger 116 is close to the vehicle 2, the vehicle 2 cannot be started. Therefore, when the undetectable object is recognized in the vicinity of the vehicle 2, the vehicle control device 10 sets off an alarm to the outside of the vehicle using the alarm device 5. Then, the vehicle control device 10 starts the vehicle 2 after confirming that the undetectable object has moved to a position at which it does not interfere with the vehicle 2.

In a starting control of the vehicle 2, the vehicle control device 10 recognizes the undetectable object using the above procedures. However, here as well, it is assumed that the external sensor 8 means the LiDAR, and in the description below, the external sensor will be written as the LiDAR 8.

Figure 9B:
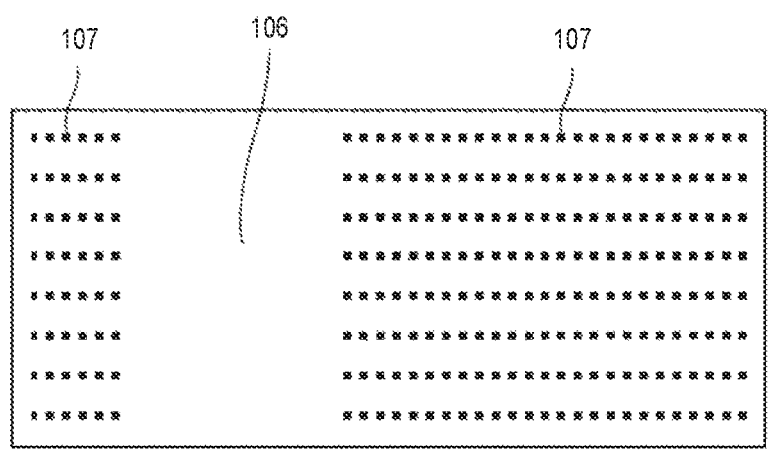
FIG. 9B is a diagram used for describing a method of recognizing the undetectable object that hinders starting of the autonomously driven vehicle.

In the example illustrated in FIG. 9A, the passenger 116 stands in front of the vehicle 2, and a stationary object 117 is present in front of the passenger 116. In this case, as illustrated in FIG. 9B, in the output image of the LiDAR 8, a point group unacquired region 106 in which the point group is not acquired appears in the point group 107 in the captured stationary object 117. It can be determined from the map information that the point group unacquired region 106 is the undetected region in which the point group 107 of the stationary object 117 is not obtained. When the undetected region is identified in the point group 107 of the stationary object 117, the vehicle control device 10 recognizes the undetectable object 116 present in front of the vehicle 2. The fact that the undetectable object 116 is a person (passenger) can be recognized by applying an object recognition method, such as pattern matching or deep learning, to the shape of the undetected region.

Figure 10:
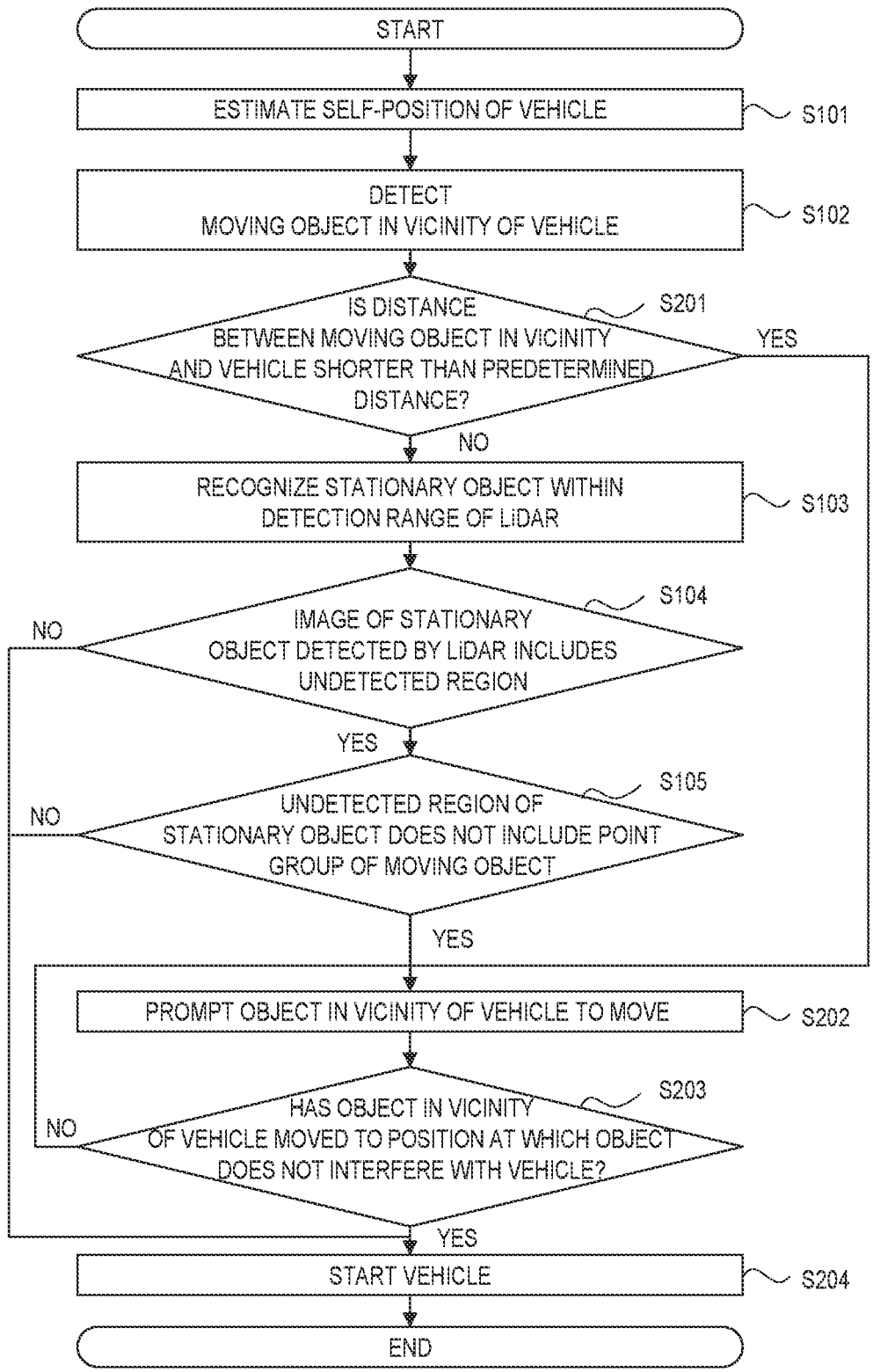
FIG. 10 is a flowchart illustrating procedures for starting the autonomously driven vehicle to which the target detection apparatus according to the first embodiment is applied.

FIG. 10 is a flowchart describing starting procedures of the vehicle 2 using the vehicle control device 10 as the target detection apparatus according to the first embodiment. In this flowchart, the same step numbers as those in the flowchart of FIG. 8 are assigned to the same processes as those in the procedures for recognizing the undetectable object. Hereinafter, the processes already described in the description of the procedures for recognizing the undetectable object will be omitted or simplified.

According to the flowchart illustrated in FIG. 10, when a moving object is detected in the vicinity of the vehicle 2 in step S102, the vehicle control device 10 determines whether the distance between the detected moving object and the vehicle 2 is shorter than a predetermined distance (step S201). The predetermined distance used in this determination is set based on the minimum distance that can sufficiently secure safety with an object in the vicinity of the vehicle at the time when the vehicle 2 starts. When the distance between the moving object and the vehicle 2 is shorter than the predetermined distance, the vehicle control device 10 sets off an alarm using the alarm device 5 and prompts the moving object in the vicinity of the vehicle 2 to move away from the vehicle 2 (step S202).

On the other hand, when the distance between the detected moving object and the vehicle 2 is equal to or longer than the predetermined distance, the vehicle control device 10 executes the processes of steps S103 and S104. Even when the moving body is not detected in step S102, the procedure proceeds from step S201 to step S103 and step S104.

In step S104, it is determined whether the image of the stationary object detected by the LiDAR 8 includes the undetected region. When the image of the stationary object detected by the LiDAR 8 does not include the undetected region, it can be determined that no undetectable object is present within the detection range of the LiDAR 8. Further, since the determination result in step S201 is negative, no moving body is present within the distance shorter than the predetermined distance from the vehicle 2. Therefore, the vehicle control device 10 determines that there is no problem in starting the vehicle 2, and starts the vehicle 2 (step S204).

When the image of the stationary object detected by the LiDAR 8 includes the undetected region, the vehicle control device 10 makes the determination of step S105. When the undetected region in which the stationary object is not detected includes the point group of the moving object, the point group is a point group of a moving body of which the distance from the vehicle 2 is equal to or longer than the predetermined distance. In other words, in this case, no undetectable object is present in the vicinity of the vehicle 2, and no moving object is present at a distance that hinders the starting of the vehicle 2. Therefore, the vehicle control device 10 determines that there is no problem in starting the vehicle 2, and starts the vehicle 2 (step S204).

When the undetected region in which the stationary object is not detected does not include the point group of the moving object, the undetected region is created by the undetectable object present between the stationary object and the vehicle. In a situation where the undetectable object present in the vicinity of the vehicle 2 is recognized, the vehicle 2 cannot be safely started. In this case, the vehicle control device 10 sets off an alarm using the alarm device 5 and prompts the object in the vicinity of the vehicle 2 to move away from the vehicle 2 (step S202).

When an alarm is set off to an object in the vicinity of the vehicle 2, the vehicle control device 10 determines whether the object in the vicinity of the vehicle 2 including the undetectable object has moved to a position at which it does not interfere with the vehicle 2, that is, to a position at which it is away from the vehicle 2 by a distance equal to or longer than the predetermined distance (step S203). The vehicle control device 10 continues to set off an alarm using the alarm device 5 until an object in the vicinity of the vehicle 2 moves to a position at which it does not interfere with the vehicle 2. Then, upon confirming that the object in the vicinity of the vehicle 2 has moved to a position at which it does not interfere with the vehicle 2, the vehicle control device 10 determines that there is no problem in starting the vehicle 2, and starts the vehicle 2 (step S204).

Application of Alert Notification to Vehicle Observer

In the description above, the vehicle 2 to which the target detection application according to the first embodiment is applied is an autonomously driven vehicle that travels autonomously. However, the target detection apparatus according to the first embodiment can also be used for an autonomously driven vehicle that is remotely assisted from a remote location via a communication network, a remotely driven vehicle that is remotely driven from a remote location via the communication network, and a vehicle directly driven by a driver. For example, when the undetectable object is recognized by the target detection apparatus, it is possible to notify an observer of the vehicle of the presence of the undetectable object so as to prompt him/her to be alert. The observer here is a remote assistance operator who remotely assists the autonomously driven vehicle, a remote driver who remotely drives the remotely driven vehicle, or a driver who is aboard the vehicle and directly drives it.

FIG. 11 is a flowchart illustrating procedures for determining a notification when the target detection apparatus according to the first embodiment is applied to an alert notification sent to the observer. In this flowchart, the same step numbers as those in the flowchart of FIG. 10 are assigned to the same processes as those in the procedures for recognizing the undetectable object. Hereinafter, the processes already described in the description of the procedures for recognizing the undetectable object will be omitted or simplified.

According to the flowchart illustrated in FIG. 11, when the moving object is detected in the vicinity of the vehicle 2 in step S102, the vehicle control device 10 determines whether the distance between the detected moving object and the vehicle 2 is shorter than a predetermined distance (step S301). The predetermined distance used in this determination is the minimum distance at which safety can be sufficiently secured with the object in the vicinity of the vehicle at the time when the vehicle 2 starts. When the distance between the moving object and the vehicle 2 is shorter than the predetermined distance, the observer of the vehicle 2 is prompted to pay attention to the vicinity of the vehicle 2 via the notification device (step S302). Examples of the notification device include an HMI, such as a speaker that sends notification via voice, a head-up display that sends notification via visual information, or a meter panel.

On the other hand, when the distance between the detected moving object and the vehicle 2 is equal to or longer than the predetermined distance, the processes of steps S103 and S104 are executed. In step S104, it is determined whether the image of the stationary object detected by the LiDAR 8 includes the undetected region. When the determination result in step S104 is negative, it can be determined that no undetectable object is present within the detection range of the LiDAR 8. Further, since the determination result in step S301 is negative, no moving body of which the distance from the vehicle 2 is shorter than the predetermined distance is present. Therefore, in this case, the alert notification is not sent to the observer of the vehicle 2.

When the determination result in step S104 is positive, the vehicle control device 10 makes the determination of step S105. When the undetected region in which the stationary object is not detected includes the point group of the moving object, the point group is a point group of a moving body of which the distance from the vehicle 2 is equal to or longer than the predetermined distance. Therefore, when the determination result in step S105 is negative, the alert notification is not sent to the observer of the vehicle 2.

When the determination result in step S105 is positive, the undetectable object that cannot be detected by the LiDAR 8 is present between the stationary object and the vehicle 2. In this case, the alert notification is sent to the observer of the vehicle 2 so as to prompt the observer to pay attention to the undetectable object present in the vicinity of the vehicle 2 via the HMI (step S302).

Second Embodiment

Overview

An overview of a second embodiment will be described with reference to FIGS. 12A, 12B, 13A and 13B.

The target detection apparatus according to the first embodiment indirectly recognizes the undetectable object that cannot be directly detected by the external sensor by using the detection result of the stationary object by the external sensor. However, depending on the environment where the vehicle is placed, there is a case where no available stationary object may be present in the vicinity of the vehicle. A second embodiment proposes a method of making an undetectable object recognizable when an available stationary object is not present. In the description of the overview of the second embodiment with reference to FIGS. 12A, 12B, 13A and 13B, it is assumed that the external sensor means the LiDAR.

Figure 12A:
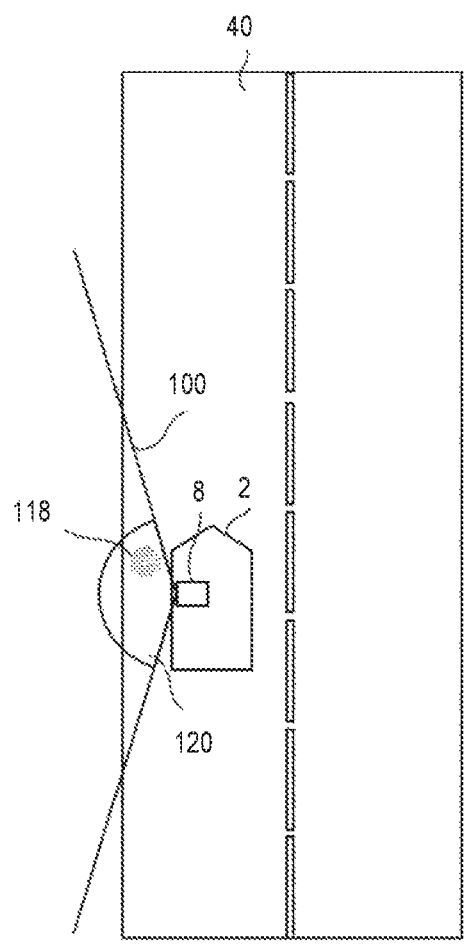
FIG. 12A is a diagram used for describing a method of recognizing the undetectable object present in a detection range of the LiDAR by using time series data of a moving object detected by the LiDAR, and a diagram illustrating a state where the moving object is detected by the LiDAR.
Figure 12B:
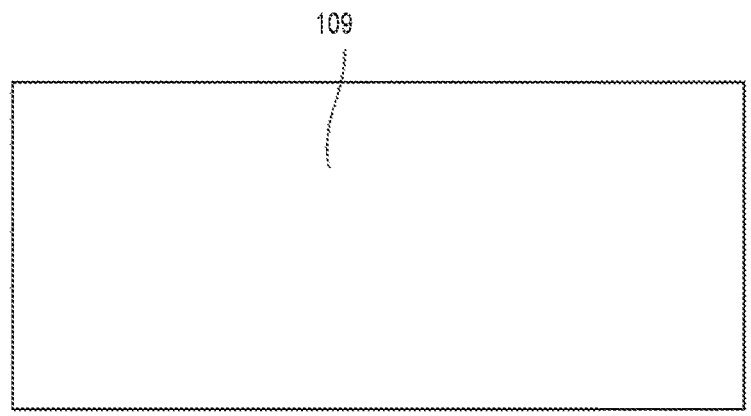
FIG. 12B is a diagram used for describing a method of recognizing the undetectable object present in a detection range of the LiDAR by using time series data of a moving object detected by the LiDAR, and a diagram illustrating a state where the moving object is detected by the LiDAR.

As described in the first embodiment, when the distance from the object to the LiDAR is extremely short, it is difficult to distinguish the point group obtained from the object from the sensor noise of the LiDAR. Specifically, as illustrated in FIG. 12A, when the object 118 is within the undetectable range 120 at a close distance from the LiDAR 8, the LiDAR 8 cannot obtain a valid point group from the object 118. Further, when no stationary object is present in the vicinity of the vehicle 2, it is not possible to obtain a point group from a stationary object. For this reason, as illustrated in FIG. 12B, a point group unacquirable region 109 in which the point group cannot be obtained is expanded in the output image of the LiDAR 8.

Figure 13A:
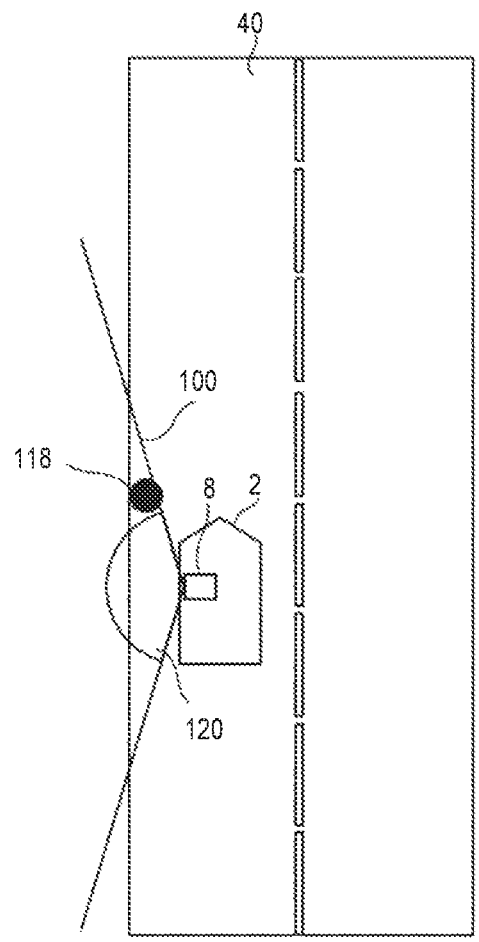
FIG. 13A is a diagram used for describing another method of recognizing the undetectable object present in the detection range of the LiDAR by using the time series data of the moving object detected by the LiDAR, and a diagram illustrating a state where the moving object cannot be detected by the LiDAR.
Figure 13B:
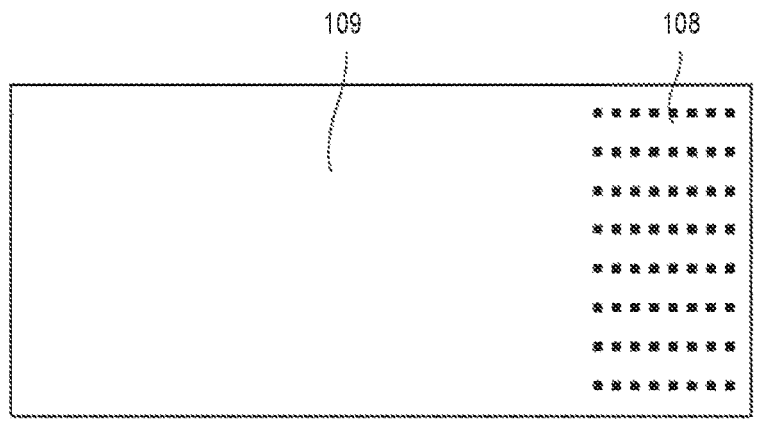
FIG. 13B is a diagram used for describing another method of recognizing the undetectable object present in the detection range of the LiDAR by using the time series data of the moving object detected by the LiDAR, and a diagram illustrating a state where the moving object cannot be detected by the LiDAR.

However, the undetectable range 120 is within the detection range 100 of the LiDAR 8. For this reason, the object 118 does not enter the undetectable range 120 directly, but enters the undetectable range 120 through a region outside the undetectable range 120 within the detection range 100, as illustrated in FIG. 13A. When the object 118 is at a position illustrated in FIG. 13A, an output image of the LiDAR 8 is obtained, as illustrated in FIG. 13B. In other words, before the object 118 enters the undetectable range 120, a point group 108 corresponding to the object 118 is obtained.

While the object 118 is being detected by the LiDAR 8, it is possible to estimate a moving speed of the object 118 with respect to the vehicle 2 from the motion of the point group 108 within the output image of the LiDAR 8. When the moving speed of the object 118 is estimated, it is possible to estimate the position of the object 118, as illustrated in FIG. 13B even when the point group disappears from the output image of the LiDAR 8. Then, based on the estimated position of the object 118, it is possible to determine whether the object 118 has entered the undetectable range 120. In other words, it is possible to indirectly recognize the undetectable object 118 present in the undetectable range 120 of the LiDAR 8.

Configuration of Autonomously Driven Vehicle

Figure 14:
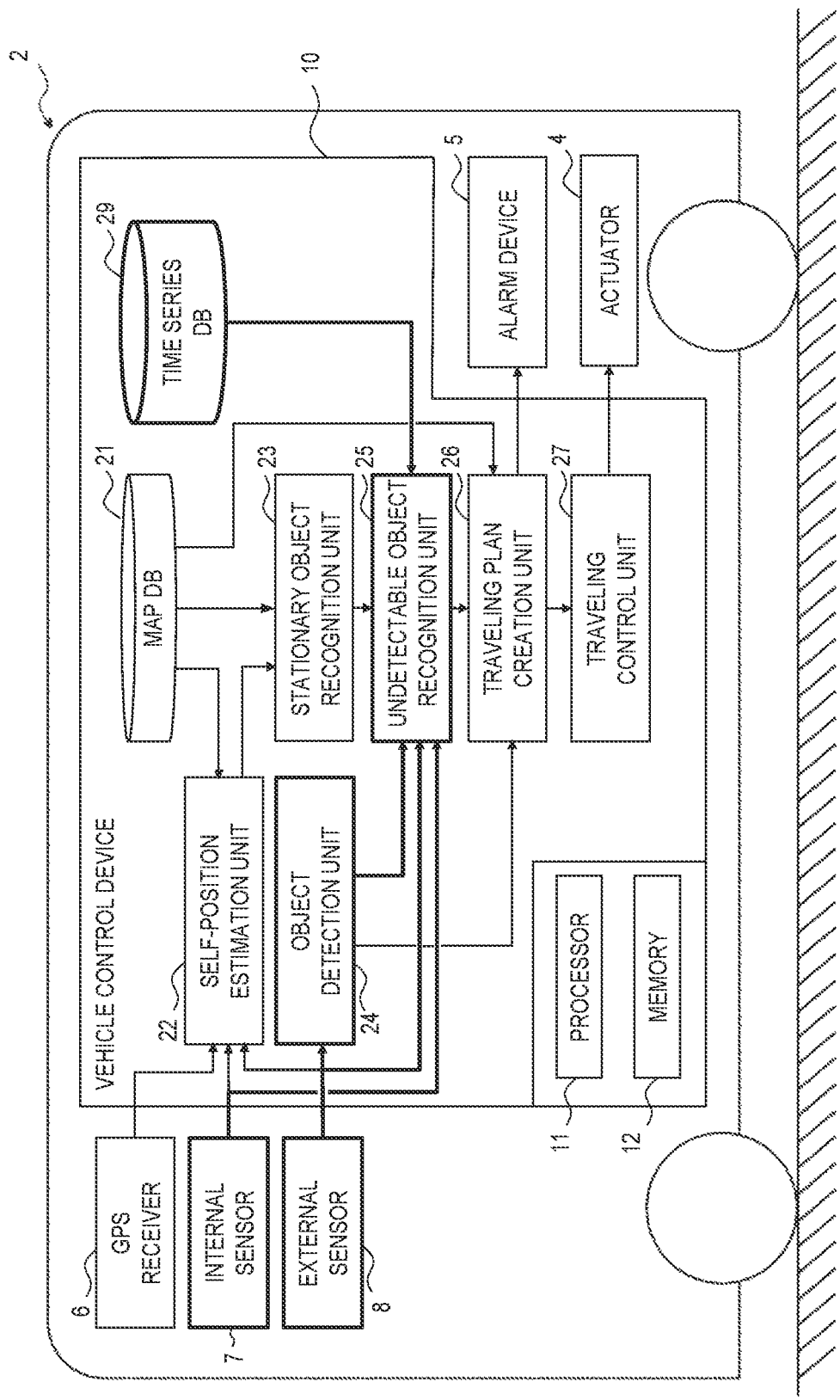
FIG. 14 is a block diagram illustrating a configuration of an autonomously driven vehicle to which a target detection apparatus according to a second embodiment is applied.

FIG. 14 is a block diagram illustrating a configuration of the vehicle 2 as an autonomously driven vehicle to which the target detection apparatus according to the second embodiment is applied. In the second embodiment, the vehicle control device 10 further includes a time series database (a time series DB) 29. In the time series DB 29, information on moving objects detected by the object detection unit 24 is registered in time series. The information registered in the time series DB 29 is used by the undetectable object recognition unit 25.

In the second embodiment, the undetectable object recognition unit 25 recognizes the undetectable object present within the detection range of the external sensor 8 by using the position information of the moving object detected by the object detection unit 24 and the information on the position and the speed of the moving object in a past frame registered in the time series DB 29. Specifically, the undetectable object recognition unit 25 determines whether the moving object detected in the past frame and registered in the time series DB 29 has been detected by the object detection unit 24 this time as well. Then, when the moving object detected in the past frame has not been detected this time, the undetectable object recognition unit 25 determines, from the speed of the moving object registered in the time series DB 29, that the moving object has entered the undetectable range of the external sensor 8. When it is estimated that the moving object has entered the undetectable range of the external sensor 8, the undetectable object recognition unit 25 recognizes the undetectable object.

Procedures for Recognizing Undetectable Object

Figure 15:
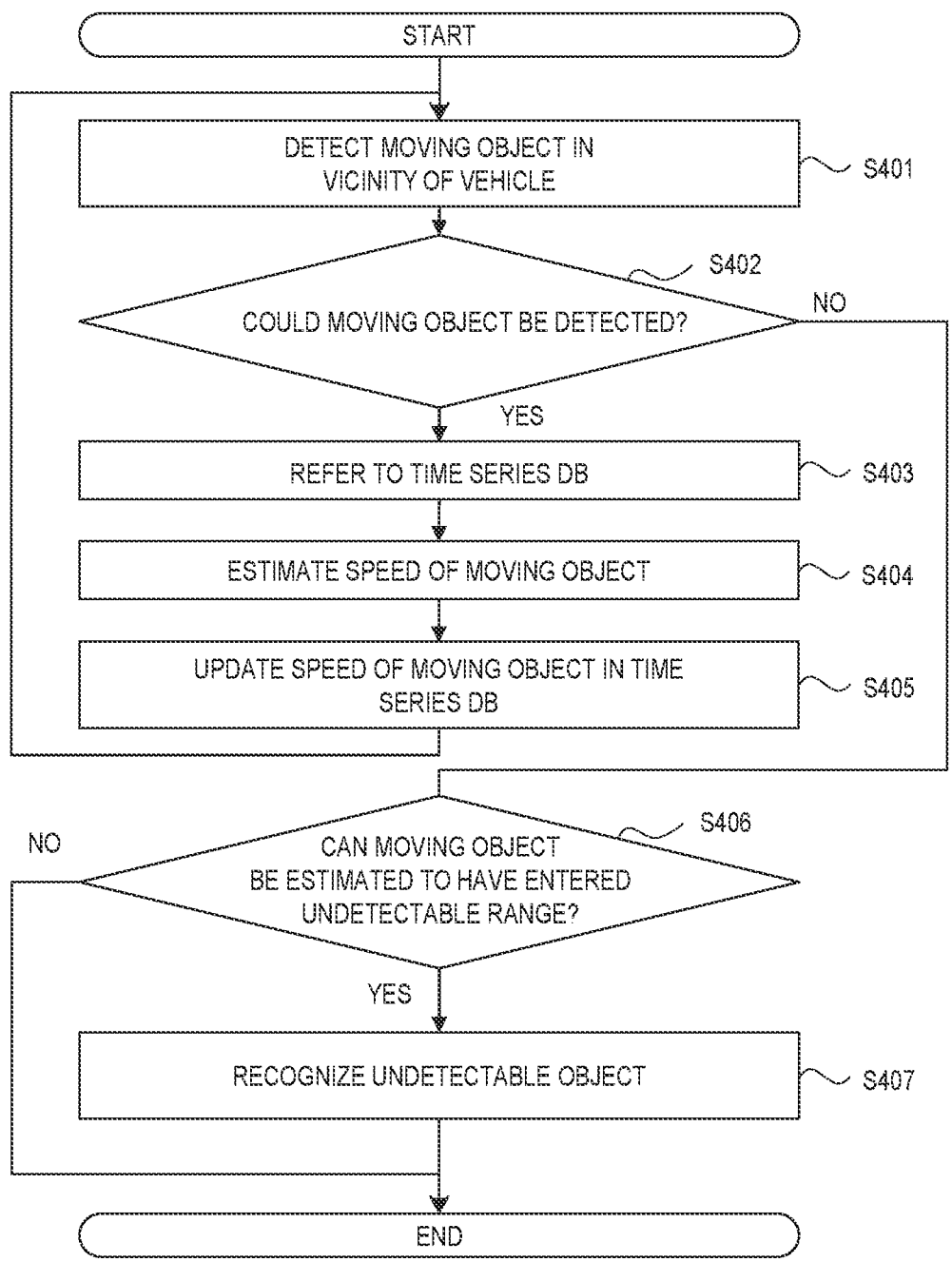
FIG. 15 is a flowchart illustrating procedures for recognizing an undetectable object by the target detection apparatus according to the second embodiment.

Next, procedures for recognizing the undetectable object according to the second embodiment will be described with reference to FIG. 15. FIG. 15 is a flowchart describing procedures for recognizing the undetectable object, using the vehicle control device 10 as the target detection apparatus according to the second embodiment. In the description of the procedures for recognizing the undetectable object with reference to FIG. 15, it is assumed that the external sensor 8 means the LiDAR. In the description of the procedures for recognition below, the external sensor is written as the LiDAR 8.

According to the flowchart illustrated in FIG. 15, the vehicle control device 10 detects a moving object present in the vicinity of the vehicle 2 based on the information acquired by the LiDAR 8 (step S401). The vehicle control device 10 determines whether the moving object could be detected in step S401 (step S402), and when the moving object is detected, the vehicle control device 10 proceeds to step S403.

When the moving object is detected in step S401, the vehicle control device 10 refers to the time series DB 29 and acquires the position information of the detected moving object in the latest past frame (step S403). Then, the vehicle control device 10 estimates the speed of the moving object based on the position information of the moving object at this time and the position information acquired from the time series DB 29 (step S404), and updates the speed information of the moving object registered in the time series DB 29 (step S405). When the position information of the moving object detected in step S401 is not registered in the time series DB 29, the process is changed to steps S404 and S405, and the position information is registered in the time series DB 29.

The vehicle control device 10 repeatedly executes a loop from step S401 to step S405 until the moving object is no longer detected in step S401. Then, when the moving object is not detected, the vehicle control device 10 proceeds to step S406 and executes a next determination. According to the flowchart illustrated in FIG. 15, there is also a case where the vehicle control device 10 proceeds to step S406 without detecting the moving object by the LiDAR 8 even once. However, a possibility that the moving object directly enters the undetectable range of the LiDAR 8, that is, the range in which the LiDAR 8 cannot acquire the point group from the object, may be ignored.

In step S406, the vehicle control device 10 determines whether the moving object has entered the undetectable range of the LiDAR 8. Whether the moving object has entered the undetectable range can be determined from the information of the moving object registered in the time series DB 29, and, more specifically, the position and the speed of the moving object immediately before it is no longer detected by the LiDAR 8. For example, when the moving direction of the moving object immediately before it is no longer detected is the direction of the undetectable range, there is a high possibility that the moving object has entered the undetectable range. However, when the moving direction of the moving object immediately before it is no longer detected is outside the direction of the undetectable range of the LiDAR 8, there is a high possibility that the moving object has left of the detection range of the LiDAR 8.

When the moving object has entered the undetectable range, the moving object cannot be detected by the LiDAR 8. Therefore, when the moving object is estimated to have entered the undetectable range, the vehicle control device 10 recognizes the undetectable object present within the undetectable range of the LiDAR 8 (step S407). With the above procedures, when no stationary object that is available for recognizing the undetectable object in the vicinity of the vehicle 2 is present, it is possible to recognize the moving object that has moved to the undetectable range of the LiDAR 8, that is, the undetectable object, from the movement of the moving object within the detection range of the LiDAR 8.

OTHER EMBODIMENTS

In each of the above-described embodiments, an example in which the external sensor 8 is the LiDAR has been specifically described, but in the target detection apparatus to which the present disclosure is applied, the external sensor 8 is not limited to the LiDAR. In other words, the external sensor 8 may be a camera, a fusion of the LiDAR and a camera, or a fusion to which a millimeter-wave radar is added.

Figure 16A:
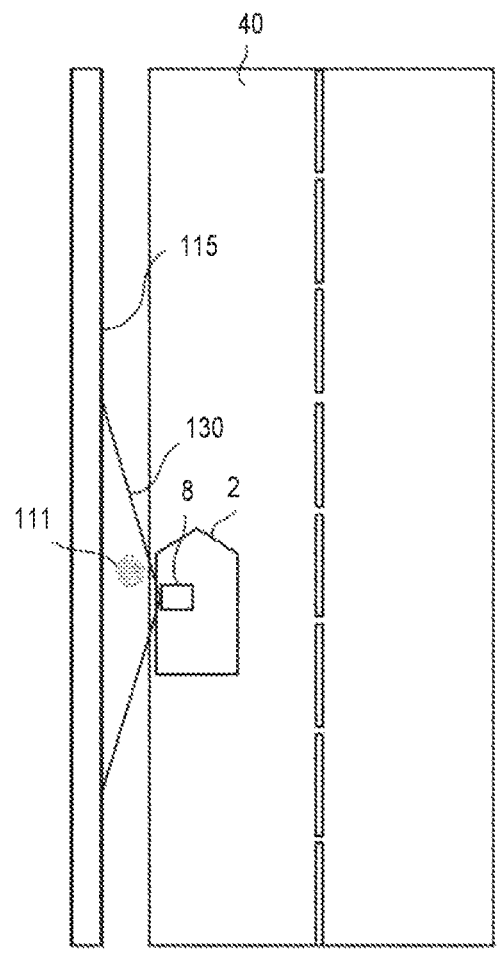
FIG. 16A is a diagram used for describing a method of recognizing the undetectable object that is not detected by a camera by using a stationary object present in the vicinity of the vehicle.
Figure 16B:
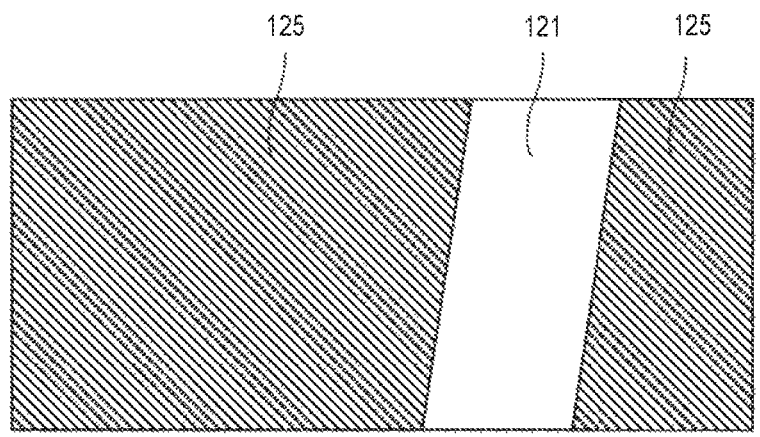
FIG. 16B is a diagram used for describing a method of recognizing the undetectable object that is not detected by a camera by using a stationary object present in the vicinity of the vehicle.

For example, FIGS. 16A and 16B are diagrams used for describing a method of recognizing, when the external sensor 8 is the camera, by using the stationary object 115, the undetectable object that is not detected by the camera 8.

When the camera 8, the stationary object 115, and the object 111 are in the positional relationship illustrated in FIG. 16A, the object 111 has entered the detection range (an angle of view) 130 of the camera 8. However, since the object 111 is in the immediate vicinity of the camera 8, it is impossible to contain the entire object 111 in the detection range 130 of the camera 8.

In this case, as illustrated in FIG. 16B, in an output image of the camera 8, an image that captures a part of the object 111 appears in an image 125 that captures the stationary object 115. However, it is impossible to recognize the object 111 using the image recognition from the image in which only a part of the object 111 is captured. Therefore, the image is treated as an image unrecognizable region in which the image recognition is impossible in the processing of the output image of the camera 8.

From the map information, it can be determined whether the image unrecognizable region 121 is an undetected region in which the image 125 is not obtained even though the stationary object 115 is present, or a region in which the stationary object 115 is not present in the first place. In other words, by checking against the stationary object recognized from the map information, it is possible to determine whether the image of the stationary object 115 detected by the LiDAR includes the undetected region.

Further, from the number of pixels in the image unrecognizable region 121, it can be determined whether the image unrecognizable region 121 is the sensor noise of the camera 8. Specifically, when the image unrecognizable region 121 corresponds to a pixel group having a predetermined number of pixels or more, it can be determined that the image unrecognizable region 121 is not a sensor noise but an undetected region in which the image 125 of the stationary object 115 is not obtained.

When the undetected region is identified in the image 125 of the stationary object 115, it is possible to indirectly recognize the undetectable object 111 present between the stationary object 115 and the vehicle 2. As described above, when the external sensor 8 is the camera, it is also possible to recognize the undetectable object that is not detected by the camera 8, by using the stationary object 115 detected by the camera 8.

When the method of recognizing an undetectable object according to the second embodiment is applied to a camera, a stereo camera that measures a distance and speed is used. However, a monaural camera can be used as long as it can be used together with a sensor that can measure speed of an object.

What is claimed is:

1. A target detection apparatus mounted on a vehicle, the target detection apparatus comprising:
   an external sensor configured to acquire information on an external situation of the vehicle;
   a storage device configured to store map information; and
   an information processing device configured to process the information acquired by the external sensor and the map information, wherein the information processing device is configured to:
   recognize a stationary object present within a detection range of the external sensor based on the map information;
   determine, by checking an image of the stationary object detected by the external sensor against the stationary object recognized from the map information, whether the image of the stationary object detected by the external sensor includes an undetected region; and
   recognize, when the undetected region is identified, an undetectable object present between the stationary object and the vehicle,
   wherein the information processing device is configured to, when a moving object which had been detected by the external sensor is not detected by the external sensor even though the moving object moving out of a detection range of the external sensor is not confirmed, recognize the undetectable object present in an undetectable range of the external sensor.

2. The target detection apparatus according to claim 1, wherein:
   the external sensor is a light detection and ranging (LiDAR); and
   the information processing device is configured to, when the image of the stationary object detected by the LiDAR includes a point group unacquired region in which a point group is not acquired and the point group unacquired region corresponds to a point group having a predetermined number of points or more, recognize the undetectable object present between the stationary object and the vehicle.

3. The detection target apparatus according to claim 1, wherein:
   the external sensor is a camera; and
   the information processing device is configured to, when the image of the stationary object detected by the camera includes an image unrecognizable region in which an image is unrecognizable and the image unrecognizable region corresponds to a pixel group having a predetermined number of pixels or more, recognize the undetectable object present between the stationary object and the vehicle.

4. An autonomously traveling vehicle comprising:
   the target detection apparatus according to claim 1; and
   a vehicle control device configured to control the vehicle based on a target including the undetectable object detected by the target detection apparatus.

5. An autonomously traveling vehicle comprising:
   the target detection apparatus according to claim 1; and
   an alarm device configured to set off an alarm to an outside of the vehicle at a time of starting the vehicle when the undetectable object is recognized by the target detection apparatus.

6. A vehicle comprising:
   the target detection apparatus according to claim 1; and
   a notification device configured to notify, when the undetectable object is recognized by the target detection apparatus, an observer of the vehicle of a presence of the undetectable object.

* * * * *